(12) United States Patent
Park et al.

(10) Patent No.: US 10,506,630 B2
(45) Date of Patent: Dec. 10, 2019

(54) METHOD FOR SCHEDULING DOWNLINK DATA CHANNEL OR UPLINK DATA CHANNEL IN NEXT RADIO NETWORK AND APPARATUS THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/934,927

(22) Filed: Mar. 23, 2018

(65) Prior Publication Data

US 2018/0279360 A1    Sep. 27, 2018

(30) Foreign Application Priority Data

Mar. 24, 2017 (KR) .................. 10-2017-0037553
Jun. 23, 2017 (KR) .................. 10-2017-0079911
Oct. 25, 2017 (KR) .................. 10-2017-0139604

(51) Int. Cl.
*H04W 72/14* (2009.01)
*H04W 72/04* (2009.01)
*H04L 5/00* (2006.01)

(52) U.S. Cl.
CPC ........... *H04W 72/14* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

2004/0160936 A1   8/2004 Liu et al.
2014/0204854 A1*  7/2014 Freda .................. H04L 1/18
                                                  370/329
(Continued)

FOREIGN PATENT DOCUMENTS

KR   10-2015-0035291 A   4/2015
WO   2015/169397 A1      11/2015
WO   2016/137532 A1      9/2016

OTHER PUBLICATIONS

Samsung, "Support of Flexible Scheduling Timing", R1-1609133, 3GPP TSG RAN WG1 #86bis, Lisbon, Portugal, Oct. 10-14, 2016, pp. 1-4.

(Continued)

*Primary Examiner* — Mohammad S Adhami
(74) *Attorney, Agent, or Firm* — IP Legal Services, LLC

(57) ABSTRACT

Provided are a method and an apparatus for scheduling a downlink data channel (PDSCH) or an uplink data channel (PUSCH). The method of a user equipment may be provided for scheduling a downlink data channel (PDSCH) or an uplink data channel (PUSCH) by a user equipment. The method may include: receiving, from a base station, timing relationship setting information on i) a timing relationship between a downlink control channel and a downlink data channel or ii) a timing relationship between a downlink control channel and an uplink data channel; and scheduling the downlink data channel (PDSCH) or the uplink data channel (PUSCH) based on the timing relationship setting information, wherein the downlink data channel (PDSCH) or the uplink data channel (PUSCH) is scheduled by a downlink control channel (PDCCH), and wherein a numerology used for reception of the downlink control channel (PDCCH) is different from a numerology used for reception (Continued)

of the downlink data channel (PDSCH) or a numerology used for transmission of the uplink data channel (PUSCH).

18 Claims, 8 Drawing Sheets

(52) U.S. Cl.
CPC ......... *H04L 5/0092* (2013.01); *H04W 72/042* (2013.01); *H04W 72/0406* (2013.01); *H04L 5/001* (2013.01)

(56) References Cited

U.S. PATENT DOCUMENTS

| | | |
|---|---|---|
| 2015/0092632 A1 | 4/2015 | Park |
| 2016/0211951 A1 | 7/2016 | Park |
| 2017/0055181 A1 | 2/2017 | Tiirola et al. |
| 2017/0085346 A1 | 3/2017 | Tiirola et al. |
| 2017/0164361 A1 | 6/2017 | Park |
| 2018/0020462 A1 | 1/2018 | Xiong et al. |
| 2018/0098312 A1* | 4/2018 | Lin ..................... H04L 1/1861 |
| 2018/0152954 A1* | 5/2018 | Golitschek Edler Von Elbwart ............ H04W 74/0808 |
| 2018/0219654 A1* | 8/2018 | Chen .................... H04L 5/0012 |
| 2019/0053232 A1 | 2/2019 | Park |
| 2019/0074935 A1* | 3/2019 | Babaei .................. H04L 1/1812 |
| 2019/0090218 A1* | 3/2019 | Noh ...................... H04L 5/0032 |

OTHER PUBLICATIONS

Zte et al., "About Slot structure and Scheduling Units for NR", R1-1608964, 3GPP TSG RAN WG1 Meeting #86bis, Lisbon, Portugal, Oct. 10-14, 2016, pp. 1-8.

CATT, "NT DL control channel design considerations", R1-1608791, 3GPP TSG RAN WG1 #86bis, Lisbon, Portugal Oct. 10-14, 2016, pp. 1-5.

Zte et al., "On Indicating HARQ and PUCCH", R1-1608958, 3GPP TSG-RAN WG1 Meeting #86bis, Lisbon, Portugal, Oct. 10-14, 2016, pp. 1-3.

Huawei et al., "Discussion on slot and mini-slot", R1-1608837, 3GPP TSG RAN WG1 Meeting #86bis, Lisbon, Portugal, Oct. 10-14, 2016, pp. 1-4.

Huawei, "Email discussion [87-24] on sTTI scheduling", R1-17xxxxx, 3GPP TSG RAN WG1 Meeting #88, Athens, Greece, Feb. 13-17, 2017, pp. 1-14.

Ericsson, "Summary of e-mail discussions on downlink control signaling", R1-1701036, TSG-RAN WG1 NR AdHoc, Spokane, WA, USA, Jan. 16-20, 2017, pp. 1-18.

LG Electronics, "Remaining details on supplementary UL in NR LTE coexistence", R1-1713221, 3GPP TSG RAN WG1 Meeting #90, Prague, Czech Republic, Aug. 21-25, 2017, pp. 1-4.

* cited by examiner

METHOD FOR SCHEDULING DOWNLINK DATA CHANNEL OR UPLINK DATA CHANNEL IN NEXT RADIO NETWORK AND APPARATUS THEREOF

CROSS REFERENCE TO RELATED APPLICATION

This application claims priority from Korean Patent Application Nos. 10-2017-0037553, 10-2017-0079911 & 10-2017-0139604, filed on Mar. 24, 2017, Jun. 23, 2017 & Oct. 25, 2017 which is hereby incorporated by reference for all purposes as if fully set forth herein.

BACKGROUND OF THE INVENTION

1. Field of the Invention

The present disclosure relates to a method for scheduling a downlink data channel (PDSCH) or an uplink data channel (PUSCH), which is a data channel resource in a next-generation/5G radio access network {hereinafter, also referred to as "NR (New Radio)"} having been discussed in $3^{rd}$ generation partnership project (3GPP).

2. Description of the Prior Art $3^{rd}$ generation partnership project (3GPP) has recently approved the study item "Study on New Radio Access Technology" for studying next-generation/5G radio access technology and, based on the same. 3GPP has been discussing a frame structure, channel coding & modulation, waveform & multiple access schemes, and the like for NR (New Radio) in radio access network working group 1 (RAN WG1). It is necessary to design NR to satisfy various requirements for respective segmented and specified usage scenarios, as well as an improved data transmission rate in comparison with long term evolution (LTE)/LTE-Advanced.

In particular, Enhanced Mobile BroadBand (eMBB), massive Machine-Type Communication (mMTC), and Ultra-Reliable and Low-Latency Communication (URLLC) have been proposed as typical usage scenarios for NR, and it required to develop more flexible frame structure design than in the case of LTE/LTE-Advanced to meet the requirements of the respective usage scenarios.

Meanwhile, to support various usage scenarios, NR supports a frame structure supporting a plurality of numerologies having different subcarrier spacing (SCS) values, and NR also supports different scheduling time intervals. Accordingly, NR may have a problem of ambiguity because it is unclear to choose a numerology that is a basis for defining a timing relationship between a user equipment and a base station when defining a timing relationship between DCI and downlink/uplink (DL/UL) data corresponding thereto.

SUMMARY OF THE INVENTION

An aspect of the present embodiments is to provide a method for configuring timing setting information based on a reference numerology and scheduling at least one of a downlink data channel (PDSCH) and an uplink data channel (PUSCH), which is a data channel resource between a user equipment and a base station, based on the configured timing setting information when an NR system supports a plurality of numerologies.

In accordance with an embodiment, a method may be provided for scheduling a downlink data channel (PDSCH) or an uplink data channel (PUSCH) by a user equipment. The method may include: receiving, from a base station, timing relationship setting information on a timing relationship between a downlink control channel and a downlink data channel or a timing relationship between a downlink control channel and an uplink data channel; and scheduling the downlink data channel (PDSCH) or the uplink data channel (PUSCH) based on the timing relationship setting information, wherein the downlink data channel (PDSCH) or the uplink data channel (PUSCH) is scheduled by a downlink control channel (PDCCH), and wherein a numerology used for reception of the downlink control channel (PDCCH) is different from a numerology used for reception of the downlink data channel (PDSCH) or transmission of the uplink data channel (PUSCH).

In accordance with another embodiment, a method may be provided for scheduling a downlink data channel (PDSCH) or an uplink data channel (PUSCH) by a base station. The method may include: configuring timing relationship setting information on a timing relationship between a downlink control channel and a downlink data channel or a timing relationship between a downlink control channel and an uplink data channel; and transmitting the timing relationship setting information to a user equipment, wherein the downlink data channel (PDSCH) or the uplink data channel (PUSCH) is scheduled by a downlink control channel (PDCCH), and wherein a numerology used for transmission of the downlink control channel (PDCCH) is different from a numerology used for transmission of the downlink data channel (PDSCH) or reception of the uplink data channel (PUSCH).

In accordance with still another embodiment, a user equipment may be provided for scheduling a downlink data channel (PDSCH) or an uplink data channel (PUSCH). The user equipment may include: a receiver configured to receive, from a base station, timing relationship setting information on a timing relationship between a downlink control channel and a downlink data channel or a timing relationship between a downlink control channel and an uplink data channel; and a controller configured to schedule the downlink data channel (PDSCH) or the uplink data channel (PUSCH) based on the timing relationship setting information, wherein the downlink data channel (PDSCH) or the uplink data channel (PUSCH) is scheduled by a downlink control channel (PDCCH), and wherein a numerology used for reception of the downlink control channel (PDCCH) is different from a numerology used for reception of the downlink data channel (PDSCH) or transmission of the uplink data channel (PUSCH).

In accordance with yet another embodiment, a base station may be provided for scheduling a downlink data channel (PDSCH) or an uplink data channel (PUSCH). The base station may include: a controller configured to configure timing relationship setting information on a timing relationship between a downlink control channel and a downlink data channel or a timing relationship between a downlink control channel and an uplink data channel; and a transmitter configured to transmit the timing relationship setting information to a user equipment, wherein the downlink data channel (PDSCH) or the uplink data channel (PUSCH) is scheduled by a downlink control channel (PDCCH), and wherein a numerology used for transmission of the downlink control channel (PDCCH) is different from a numerology used for transmission of the downlink data channel (PDSCH) or reception of the uplink data channel (PUSCH).

According to the embodiments, a method may be provided for configuring timing setting information based on a reference numerology and scheduling a downlink data channel (PDSCH) or an uplink data channel (PUSCH), which is a data channel resource between a user equipment and a base station, on the basis of the configured timing setting information when an NR system supports a plurality of numerologies.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
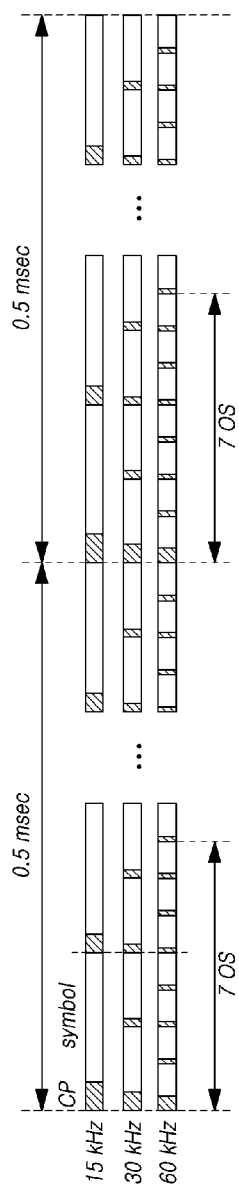
FIG. 1 is a diagram illustrating orthogonal frequency division multiplexing (OFDM) symbol alignment when different subcarrier spacing values are used according to at least one of embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear. As used herein, a wireless communication system may be a system for providing various communication services such as a voice service and a packet data service. The wireless communication system may include a User Equipment (UE) and a Base Station (BS or an eNB).

The user equipment may be a comprehensive concept that indicates a terminal for use in wireless communication, including a UE (User Equipment) in wideband code division multiple access (WCDMA), LTE, high speed packet access (HSPA), international mobile telecommunication (IMT)-2020 (5G or New Radio), and the like, and a MS (Mobile station), a UT (User Terminal), an SS (Subscriber Station), a wireless device, and the like in global system for mobile communication (GSM).

A base station or a cell may generally refer to a station where communication with a User Equipment (UE) is performed. Such a base station or cell may denote inclusively, all of various coverage areas such as a Node-B, an evolved Node-B (eNB), gNode-B (gNB), Low Power Node (LPN), a Sector, a Site, various types of antennas, a Base Transceiver System (BTS), an Access Point, a Point (e.g., transmitting point, receiving point, or tranceiving point), a Relay Node, a Mega Cell, a Macro Cell, a Micrro Cell, a Pico Cell, a Femto Cell, a Remote Radio Head (RRH), a Radio Unit (RU), and a Small Cell.

Each of the cells has a base station that controls a corresponding cell. Thus, the base station may be construed in two ways. 1) the base station may be a device itself that provides a megacell, a macrocell, a microcell, a picocell, a femtocell, and a small cell in association with a wireless area, or 2) the base station may indicate a wireless area itself. In 1), all devices that interact with one another to enable the devices that provide a predetermined wireless area to be controlled by an identical entity or to cooperatively configure the wireless area, may be indicated as a base station. Based on a configuration type of a wireless area, a point, a transmission/reception point, a transmission point, a reception point, or the like may be an embodiment of a base station. In ii), a wireless area itself that receives or transmits a signal from a perspective of a terminal or a neighbouring base station, may be indicated as a base station.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

In the specification, the user equipment and the base station are used as two (uplink or downlink) inclusive transceiving subjects to embody the technology and technical concepts described in the specifications. However, the UE and the base station may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Uplink transmission and downlink transmission may be performed using a TDD (Time Division Duplex) scheme that performs transmission based on different times. Uplink transmission and downlink transmission may also be performed using an FDD (Frequency Division Duplex) scheme that performs transmission based on different frequencies or a mixed scheme of the TDD and FDD schemes.

Further, in a wireless communication system, a standard may be developed by configuring an uplink and a downlink based on a single carrier or a pair of carriers.

The uplink and the downlink may transmit control information through a control channel, such as a PDCCH (Physical Downlink Control CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

A downlink may refer to communication or a communication path from a multi-transmission/reception point to a terminal, and an uplink may refer to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, a situation, in which signals are transmitted and received through a channel such as a PUCCH, a PUSCH, a PDCCH, or a PDSCH, will be expressed as the transmission and reception of a PUCCH, a PUSCH, a PDCCH, or a PDSCH.

Meanwhile, higher layer signaling includes an RRC signaling that transmits RRC information including an RRC parameter.

A base station performs downlink transmission to terminals. A base station may transmit a physical downlink control channel for transmitting downlink control information such as scheduling required to receive a downlink data channel that is a main physical channel for unicast transmission, and scheduling approval information for transmission on an uplink data channel. Hereinafter, transmission and reception of a signal through each channel will be described as transmission and reception of a corresponding channel.

Varied multiple access schemes may be unrestrictedly applied to the wireless communication system. Various multiple access schemes, such as TDMA (Time Division Multiple Access), FDMA (Frequency Division Multiple Access), CDMA (Code Division Multiple Access), OFDMA (Orthogonal Frequency Division Multiple Access), NOMA (Non-Orthogonal Multiple Access), OFDM-TDMA, OFDM-FDMA, OFDM-CDMA, and the like may be used. Here, NOMA includes SCMA (Sparse Code Multiple Access), LDS (Low Cost Spreading), and the like.

An embodiment of the present disclosure may be applicable to resource allocation in an asynchronous wireless communication scheme that evolves into LTE/LTE-advanced and IMT-2020 through GSM, WCDMA, and HSPA, and may be applicable to resource allocation in a synchronous wireless communication scheme that evolves into CDMA, CDMA-2000, and UMB.

In the present specifications, a machine type communication (MTC) terminal refers to a terminal that is low cost (or is not very complexity), a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type. Alternatively, the MTC terminal may refer to a further Enhanced MTC terminal defined in Release-14.

In the present specification, a NarrowBand-Internet of Things (NB-IoT) user equipment represents a user equipment supporting radio access for the cellular IoT. The objectives of NB-IoT technology include improved indoor coverage, support for large-scale and low-speed user equipments, low-latency sensitivity, low-cost user equipments, low power consumption, and optimized network architecture.

Enhanced Mobile Broadband (eMBB), massive Machine-Type Communication (mMTC), and Ultra-Reliable and Low-Latency Communication (URLLC) have been proposed as typical usage scenarios in NR (New Radio), which are under discussion in 3GPP.

In the present specification, a frequency, a frame, a subframe, a resource, a resource block, a region, a band, a subband, a control channel, a data channel, a synchronization signal, various reference signals, various signals, and various messages in relation to NR (New Radio) may be interpreted according to various meanings, which have been used in the past, are being used presently, or will be used in the future.

NR (New Radio)

Recently, 3GPP has approved the study item "Study on New Radio Access Technology" for research on next-generation/5G radio access technology, and has started discussions on a frame structure, channel coding & modulation, waveform & multiple access schemes, and the like for NR (New Radio) based on the same.

It is required to design NR to satisfy various requirements for respective segmented and specified usage scenarios, as well as an improved data transmission rate in comparison with LTE/LTE-Advanced. In particular, enhanced Mobile BroadBand (eMBB), massive Machine-Type Communication (mMTC), and Ultra-Reliable and Low-Latency Communication (URLLC) have been proposed as typical usage scenarios of the NR, and flexible frame structure design is required, compared to LTE/LTE-Advanced, in order to meet the requirements of the respective usage scenarios.

The respective usage scenarios have different requirements for data rates, latency, coverage, or the like. Thus, in order to efficiently satisfy the requirements for the respective usage scenarios through a frequency band constituting an NR system, there is a need for a method of efficiently multiplexing radio resource units on the basis of different numerologies (e.g., subcarrier spacing, subframes, TTIs, or the like).

To this end, there have been discussions on a method of multiplexing and supporting numerologies having different subcarrier spacing (SCS) values, based on TDM, FDM, or TDM/FDM, through a single NR carrier and a method of supporting one or more time units when a scheduling unit is configured in a time domain. In this regard, in NR, a subframe has been defined as one of time-domain structure, and there was a decision to define, as a reference numerology for defining corresponding subframe duration, a single subframe duration including 14 OFDM symbols of normal CP overhead on the basis of 15 kHz-subcarrier spacing (SCS), which is the same as LTE. According to this, the subframe in NR has a time duration of 1 ms. However, unlike LTE, a slot and a mini-slot may be defined as a time unit, which is a basis of actual uplink/downlink data scheduling, for the absolute reference time duration in the subframe of the NR. In this case, the number of OFDM symbols (a 'y' value) constituting the corresponding slot has been determined to have a value of y=14 irrespective of the numerology.

Accordingly, any slot may include 14 symbols. All of the symbols may be used for DL transmission, all of the symbols may be used for UL transmission, or the symbols may be used in the form of a DL portion+a gap+a UL portion according to a transmission direction of the corresponding slot.

In addition, a mini-slot including fewer symbols than a corresponding slot may be defined in a numerology (or SCS), and, based on the same, a short time-domain scheduling interval may be configured for uplink/downlink data transmission/reception, or a long time-domain scheduling interval may be configured for uplink/downlink data transmission/reception through slot aggregation.

In particular, in the case of transmission/reception of latency-critical data such as URLLC, when the scheduling is performed in a slot unit of 1 ms (14 symbols) defined in a frame structure based on a numerology having a small SCS value such as 15 kHz, it may be difficult to satisfy the latency requirements. Therefore, a mini-slot including fewer OFDM symbols than the corresponding slots may be defined, thereby enabling scheduling for latency-critical data, such as the URLLC, based on the same.

Alternatively, a method is also under consideration for supporting numerologies having different SCS values by multiplexing the same using a TDM scheme or an FDM scheme in a single NR carrier as described above, thereby scheduling data to conform to the latency requirements based on a slot (or mini-slot) length defined for each numerology. For example, in the case where the SCS is 60 kHz as shown in FIG. 1, the symbol length thereof is reduced to about ¼ of the symbol length for the SCS of 15 kHz. Therefore, when a single slot includes 14 OFDM symbols, the 15 kHz-based slot is 1 ms long, while the 60 kHz-based slot length is reduced to about 0.25 ms.

As described above, in NR, there is discussion on a method for satisfying the respective requirements of the URLLC and the eMBB by defining different SCS values or different TTIs.

In NR, there is also discussion on a frame structure for supporting a plurality of numerologies having different subcarrier spacing values. More specifically, in NR, there has been discussion on a method for supporting a numerology family having subcarrier spacing values on the basis of 15 kHz*2^n. Specifically, it has been considered to support the SCS cases when n=0, 1, 2, 3, 4, and 5. As described above, since a plurality of numerologies are supported in NR, the OFDM symbol lengths depending on SCS values may be different for the respective numerologies as shown in FIG. 1, and the length of a slot having the same value may vary with the SCS value. For example, even in the case where numerologies N1 and N2 have SCS values of 15 kHz and 30 kHz, respectively, the number of OFDM symbols constituting one slot is set as y=14 in the numerology N1, and the number of OFDM symbols constituting one slot is also set as y=14 in the numerology N2, the corresponding slot lengths are different, such as 1 ms and 0.5 ms, respectively.

Alternatively, different time-domain scheduling intervals may be defined even in the same numerology by defining a slot including 14 symbols or configuring a mini-slot including fewer symbols than a slot as a scheduling unit in the time domain for each user equipment or by defining a time-domain scheduling unit through aggregation of a plurality of slots.

In the case where a plurality of time-domain scheduling intervals can be set, when support for a plurality of numerologies is set through a single NR frequency band in any NR user equipment, different numerologies or scheduling intervals are set between a downlink and an uplink (e.g., a downlink is on the basis of a slot and an uplink is on the basis of a mini-slot), or different numerologies or scheduling intervals are set between different component carriers (CCs) (e.g., the CC #1 is on the basis of a slot and the CC #2 is on the basis of a mini-slot) in the case of supporting carrier aggregation (CA), synchronization between the base station and the user equipment is required in order to interpret information related to a timing relationship set by DCI or an upper layer for an NR user equipment.

For example, when an NR user equipment, in which carrier aggregation is set for the CC #1 having a SCS value of 15 kHz and the CC #2 having a SCS value of 60 kHz, is configured such that scheduling is performed in the CC #1 based on a slot of y=14 and scheduling is performed in the CC #2 based on a slot of y=14, a scheduling unit and a downlink control channel monitoring unit according thereto may be 1 ms and 0.25 ms in the CC #1 and the CC #2, respectively. In this case, when a timing relationship between DCI and corresponding data or a timing relationship between data and corresponding ACK/NACK feedback is set to a specific 'k' value, it is necessary to define whether a timing length, which is a reference of the 'k' value, is set to 1 ms or 0.25 ms.

For example, in the case where timing relationship-related information (e.g., timing gap information) between any UL assignment and corresponding UL data transmission is defined to be dynamically set in a unit of a corresponding scheduling interval through L1 signaling (i.e., corresponding UL assignment DCI), when applying a timing gap 'k' set through the corresponding UL assignment DCI in the user equipment, it should be clearly defined whether a slot including 14 15 kHz-based symbols (i.e., 1 ms), which is a scheduling interval of the CC #1, is set as a reference scheduling interval or a slot including 14 60 kHz-based symbols (i.e., 0.25 ms), which is a scheduling interval of the CC #2, is set as a reference scheduling interval.

In particular, when cross-carrier scheduling is applied, since there is a difference between a time-domain scheduling interval for DCI transmission and a time-domain scheduling interval for data transmission corresponding thereto, it is necessary to clarify the interpretation thereof.

As described above, there is a discussion on a method for supporting scheduling units having different lengths in a time domain in order to satisfy various usage scenarios in NR. In particular, to satisfy the URLLC requirements, it is necessary to subdivide the scheduling unit in the time domain. However, excessively subdivided time-domain scheduling units are not desirable in terms of cell throughput for the eMBB because they involve excessive control overhead. In addition, a longer time-domain resource assignment structure may be more suitable for the coverage enhancement in terms of the mMTC.

In particular, when support for eMBB, URLLC, or mMTC-related data transmission/reception is required for any user equipment, a PDSCH (Physical Downlink Shared Channel) or a PUSCH (Physical Uplink Shared Channel) resource assignment method based on different time-domain scheduling units is required for the user equipment.

Alternatively, in the case where carrier aggregation (CA) for a plurality of NR component carriers (CCs) operating based on different SCS values or for cells thereof is set and activated for a user equipment, when transmitting and receiving scheduling control information on the aggregated NR CCs or cells, it is required to define a method to eliminate ambiguity for a base station and a user equipment to set and interpret time-domain scheduling-related information depending on a difference of a slot length, which is a basis of a time-domain scheduling unit for each NR CC.

In accordance with at least one embodiment, a method may be provided for transmitting and receiving downlink control information for supporting downlink data channel/ uplink data channel (PDSCH/PUSCH) assignment based on different time-domain scheduling units or transmission time intervals (TTIs) for any user equipment.

As described above, to support a URLLC service in NR, it is necessary to support a short scheduling unit {or Transmission Time Interval (TTI)} capable of satisfying a latency boundary in the time domain. On the other hand, in the case of eMBB or mMTC, it may be efficient to apply a longer time-domain resource assignment unit than the URLLC usage scenario in terms of control overhead and coverage when defining a scheduling unit in the time domain. To satisfy various usage scenarios of NR as described above, it is necessary to support a mixed numerology structure supporting a numerology of subcarrier spacing (e.g., larger subcarrier spacing, such as 60 kHz, 120 kHz, or the like), which makes it easy to define a short time-domain resource assignment unit suitable for the URLLC, and a numerology of subcarrier spacing suitable for the eMBB and the mMTC (e.g., 15 kHz for the eMBB or 3.75 kHz for the mMTC) through a single NR carrier, or to simultaneously support time-domain scheduling units having different lengths, such as a mini-slot, a slot, or aggregated slots, in an NR carrier that operates as a single numerology. In particular, when one user equipment supports a plurality of usage scenarios (that is, when one user equipment supports services in relation to the eMBB, the URLLC, or the mMTC), a base station may set a plurality of TTIs for the user equipment.

In accordance with at least one embodiment, a method may be provided for assigning resources of a downlink data channel/uplink data channel (PDSCH/PUSCH) for a user equipment, and a method may be also provided for setting a CORESET and configuring downlink control information (DCI) related thereto when a plurality of TTI types (e.g., a mini-slot, a slot, or aggregated slots) are supported through a single user equipment.

As described above, a base station may set a TTI for a downlink data channel (PDSCH) or an uplink data channel (PUSCH) for a user equipment through UE-specific/UE-group-specific/cell-specific higher layer signaling. In particular, a TTI type may be defined to be independently set for a PDSCH and a PUSCH or the same TTI type may be defined to be set for a PDSCH and a PUSCH. In the present disclosure, a mini-slot, a slot, or aggregated slots for defining a corresponding TTI length as a time-domain resource assignment unit for the PDSCH or the PUSCH for any user equipment will be referred to as a "TTI type", but the present disclosure is not limited to that term. Alternatively, the TTI type may be defined as a set of subcarrier spacing (SCS) and a corresponding SCS-based time-domain scheduling unit (i.e., a mini-slot, a slot, or aggregated slots). That is, the TTI type may be separated by means of a mini-slot, a slot, and aggregated slots, which are time-domain scheduling units defined above, or the TTI type may be defined according to a set of parameters that determine the actual TTI length, such as the SCS, time-domain scheduling unit setting (a slot, a mini-slot, aggregated slots, and the like), and the number of symbols constituting the corresponding time-domain scheduling unit (i.e., the number of symbols constituting a mini-slot, a slot, or aggregated slots), or the number of slots constituting the aggregated slots.

When a plurality of TTI types are set for PDSCH or PUSCH resource assignment for any user equipment as described above, a base station needs to indicate the TTI type to be applied to the corresponding resource assignment when assigning resources of a PDSCH or a PUSCH.

For example, the TTI type may be defined for each control resource set (CORESET) or a search space, which is set for downlink control channel (PDCCH) transmission. That is, an NR base station/cell may set a CORESET for a user equipment for downlink control information (DCI) for the user equipment in the cell. The CORESET may be set through UE-specific/UE-group-specific/cell-specific higher layer signaling, and a search space including PDCCH candidates to be monitored by the user equipment may be defined through respective CORESETs set for the user equipment. In addition, a plurality of CORESETs may be defined to be set for a user equipment. When a CORESET or a search space configured according thereto is set for a user equipment, scheduling control information transmitted through the CORESET (i.e., a TTI type of a PDSCH or PUSCH assigned through DL assignment DCI and UL grant) may be defined to be indicated through UE-specific/UE-group-specific/cell-specific higher layer signaling. That is, the TTI type of a PDSCH or PUSCH may be defined to be set by DCI transmitted through a CORESET or a search space for each CORESET or search space set for a user equipment. Additionally, the base station may set a monitoring period for each CORESET, and in this case, the TTI type corresponding to the corresponding CORESET may be defined to be implicitly determined by means of the monitoring period. Alternatively, the TTI type may be set separately from the monitoring period. Alternatively, a DCI format or a PDSCH and PUSCH transmission mode to be monitored for each CORESET may be set. In this case, the TTI type may be implicitly set according to monitoring DCI format setting information or transmission mode setting information. More specifically, a DCI format or a transmission mode may be separately defined for respective TTI types, and the TTI type of a PDSCH or PUSCH scheduled through the CORESET may be defined to be implicitly determined by setting the DCI format or the transmission mode to be monitored through the CORESET.

As another method for indicating the TTI type, the TTI type for a PDSCH or PUSCH, in which resource assignment is performed through DCI, may be defined to be dynamically signaled through DL assignment DCI or UL grant. That is, the TTI type may be defined to be directly indicated through the DCI whenever scheduling control information is transmitted without limiting the TTI type scheduled through each CORESET.

Additionally, when transmitting scheduling control information for the PDSCH/PUSCH, definition may be made to include timing indication information between DL assignment DCI and a PDSCH, timing indication information between a PDSCH and HARQ ACK/NACK feedback of a user equipment, or timing indication information between UL grant and PUSCH transmission.

As a method of configuring the timing indication information, the timing indication information may be TTI indication information. The TTI indication information may be slot index, mini-slot index, or starting slot index information. However, slot indexing or mini-slot indexing may vary for respective user equipments depending on the TTI type set for each user equipment or information for setting the number of symbols constituting a mini-slot or a slot. That is, as described above, the TTI indication information set for the user equipment may vary depending on subcarrier spacing (SCS) and the number of symbols constituting the slot or the number of symbols constituting the mini-slot in NR. For example, even for user equipments scheduled in a slot unit or in an NR carrier, actual slot indexing or mini-slot indexing may vary depending on transmission numerology for each user equipment (i.e., a SCS value), the number of symbols constituting the slot (7 or 14), or the number of symbols constituting the mini-slot. Alternatively, the slot indexing or mini-slot indexing may vary depending on a change in the slot setting information or the mini-slot setting information even in a single user equipment. Therefore, a slot indexing or mini-slot indexing rule is required for the timing indication. In accordance with at least one embodiment, a method may be provided for performing slot indexing and mini-slot indexing in a subframe unit of 1 ms described above. That is, the number and boundary of the slots or mini-slots constituting a subframe unit of 1 ms may be defined to be determined according to the SCS and the number of symbols constituting the slot or mini-slot set for a user equipment. Thus, respective slots and mini-slots are indexed in subframe units.

Figure 2:
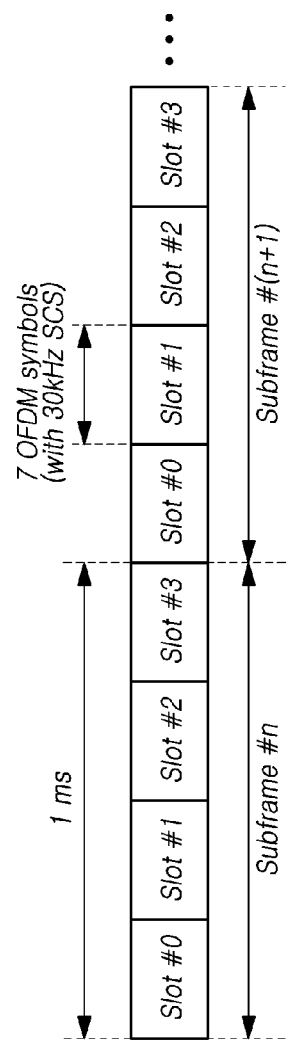
FIG. 2 is a diagram illustrating an example of slot indexing including 7 OFDM symbols having a subcarrier spacing value of 30 kHz according to at least one of embodiments.

FIG. 2 is a diagram illustrating an example of slot indexing including 7 OFDM symbols having a subcarrier spacing value of 30 kHz according to at least one of embodiments.

Referring to FIG. 2, for example, when a slot including 7 30 kHz-SCS-based symbols is configured as a time-domain scheduling unit for a user equipment, a subframe of 1 ms may include 4 slots, as shown in FIG. 2, and the respective slots are indexed from the slot #0 to the slot #3 in a subframe unit.

Figure 3:
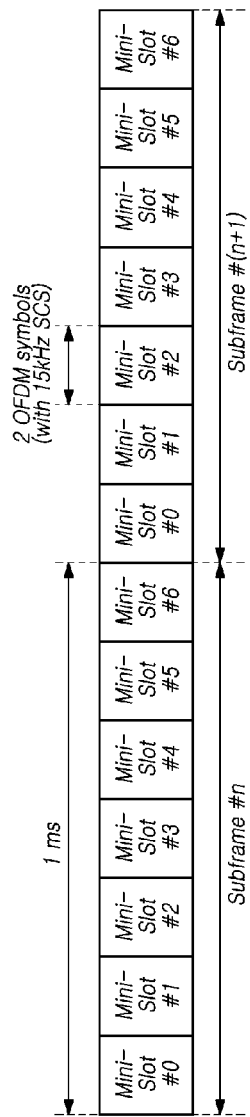
FIG. 3 is a diagram illustrating an example of mini-slot indexing including 3 OFDM symbols having a subcarrier spacing value of 15 kHz according to at least one of embodiments.

FIG. 3 is a diagram illustrating an example of mini-slot indexing including 2 OFDM symbols having a subcarrier spacing value of 15 kHz according to at least one of embodiments.

When a mini-slot including 2 15 kHz-based symbols is defined as a time-domain scheduling unit for a user equipment, definition may be made such that a subframe of 1 ms may include 7 mini-slots as shown in FIG. 3 and the respective mini-slots are indexed from the slot #0 to the slot #6 in a subframe unit.

Accordingly, TTI indication information may include subframe index indication information+slot indication information or subframe index indication information+a mini-slot index information according to the TTI type set for the user equipment. However, if the symbols have a remainder when they are divided by a 1 ms unit for configuring mini-slots, the last remaining symbols may not be defined as a mini-slot, or the remaining symbols may be defined to constitute the last mini-slot in the subframe.

Alternatively, the present disclosure may encompass the case where the slot indexing and the mini-slot indexing are performed in a unit of any fixed time duration (e.g., a radio frame), instead of the subframe of 1 ms.

As another method of configuring timing indication information, the timing indication information may be timing gap information. The timing gap information may be indicated in the form of an index gap between a TTI for DCI transmission and a TTI for PDSCH or PUSCH transmission or between a TTI for PDSCH transmission and a TTI for HARQ ACK/NACK feedback according to a slot indexing or mini-slot indexing rule and the TTI type setting information. Alternatively, as a method for eliminating ambiguity, the timing gap information may be subframe gap information and slot index or mini-slot indication information in the subframe. That is, the subframe gap information may be defined to be indicated in a subframe unit defined regardless of the setting of the TTI type for the timing gap information, and timing indication in the subframe may be defined to be performed by means of absolute slot index or mini-slot index information.

Additionally, slot indexing or mini-slot indexing and timing indication information setting may be applied regardless of the subframe indexing method.

In addition, an ambiguous situation in which a base station/network sets the timing relationship-related information and a user equipment interprets the same may occur in the case where CA for a plurality of NR CCs or cells operating based on different SCS values is set/activated in a user equipment. More specifically, as described above, timing relationship setting information between radio channels, which may be defined to be set by the base station/network and to be indicated to the user equipment, may include 1) timing relationship setting information between DL assignment DCI transmitted through a PDCCH and PDSCH transmission corresponding thereto, 2) timing relationship setting information between UL grant transmitted through a PDCCH and PUSCH transmission corresponding thereto, and 3) timing relationship setting information between a PDSCH reception timing of the user equipment and an HARQ ACK/NACK feedback timing thereof. The timing relationship setting information may be set by the base station/network, and the timing relationship may be transmitted to respective user equipments through L1 control signaling transmitted through a PDCCH, such as DL assignment DCI and UL grant, or through UE-specific/cell-specific higher layer signaling.

When the timing relationship-related information between radio channels is set by the network/base station and is transmitted to the user equipment as described above, the base station must be synchronized with the user equipment for a time unit, which is a timing relationship setting unit. For example, when the timing relationship-related information between the base station and the user equipment is set and interpreted in a slot unit, ambiguity of the slot length must be eliminated between the base station and the user equipment.

Figure 4:
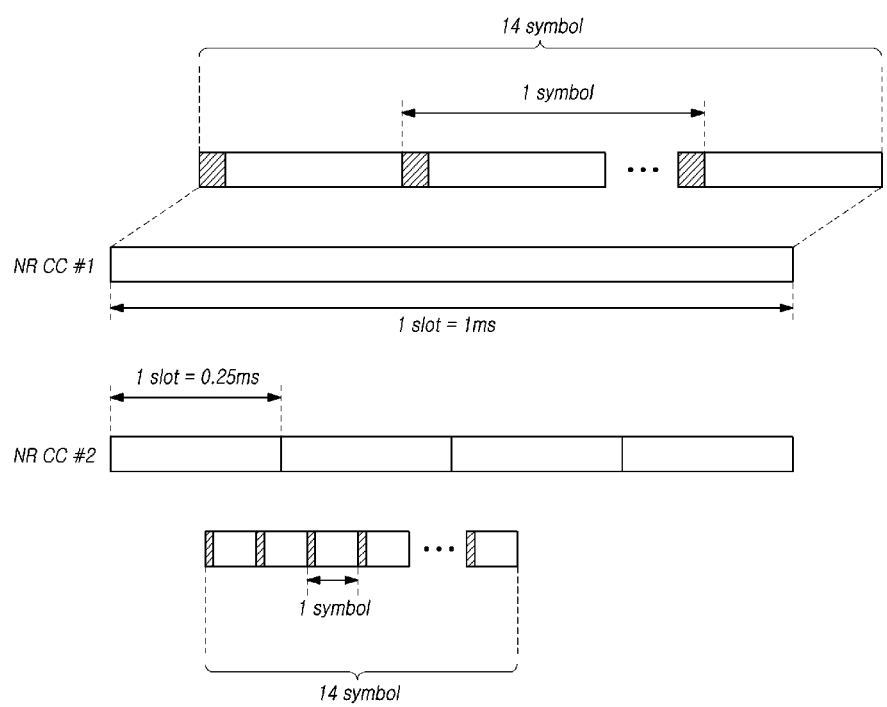
FIG. 4 is a diagram illustrating aggregation of an NR component carrier #1 having a subcarrier spacing value of 15 kHz and an NR component carrier #2 having a subcarrier spacing value of 60 kHz according to at least one of embodiments.

However, when CA between NR CCs or cells having different SCS values is set/activated in a user equipment, a slot length, which is a fundamental time-domain scheduling unit, may vary for respective NR CCs. For example, when CA for an NR CC #1 configured on the basis of 15 kHz-SCS of a normal CP and an NR CC #2 configured on the basis of 60 kHz-SCS of a normal CP is configured in a user equipment and the normal CP case is defined as 1 slot=14 OFDM symbols, the NR CC #1 and the NR CC #2 have different slot lengths of 1 ms and 0.25 ms, respectively, as shown in FIG. 4.

Even when the slot lengths between the NR CCs aggregated for any user equipment are different, it is necessary to define a clear method for indicating a timing relationship between the user equipment and the base station.

In particular, when cross-carrier scheduling between the NR CCs having different slot lengths is applied, it is necessary to define a method of setting and interpreting a timing relationship between PDCCH transmission including scheduling DCI, which is indicated through DL assignment DCI or UL grant or is set through higher layer signaling, and PDSCH or PUSCH transmission corresponding thereto.

The embodiments described below may be applied to user equipments, base stations, and core network entities (MMEs) using any mobile communication technology. For example, embodiments may be applied to next-generation mobile communication (5G mobile communication or New-RAT) user equipments, base stations, and core network entities {Access and Mobility function (AMF)}, as well as mobile communication user equipments adopting LTE technology. Hereinafter, for the convenience of description, a base station may represent an eNB of an LTE/E-UTRAN or a base station {a CU (Central Unit), a DU (Distributed Unit), or a single logical entity implemented by a CU and a DU} or a gNB in a 5G radio network in which the CU and the DU are separated.

The numerologies described herein refer to numerical characteristics and numerical values related to data transmission/reception, and the numerologies may be determined by a value of subcarrier spacing (hereinafter, also referred to as SCS). Hence, different numerologies may mean that the subcarrier spacing values for determining the numerologies are different.

In the present specification, a timing relationship, for example, may refer to a timing between DL assignment DCI transmitted through a downlink control channel (PDCCH) and a downlink data channel (PDSCH) corresponding thereto or a timing between UL grant transmitted through a downlink control channel (PDCCH) and an uplink data channel (PUSCH) corresponding thereto.

The timing relationship setting information denotes information used for setting the above-mentioned timing relationship, and the timing relationship may also be expressed as timing granularity. In addition, the timing relationship setting information may include information such as the time-domain scheduling interval (or TTI) described above, and a timing gap, a time unit, a slot length, a slot index, and a reference slot index, which are used for indicating the same.

In the present specification, the slot length may be expressed as the number of OFDM symbols constituting a slot, or the slot length may be expressed as time occupied by a slot. For example, when a 15 kHz-SCS-based numerology is used, the length of a single slot may be expressed as 14 OFDM symbols or may be expressed as 1 ms.

Figure 5:
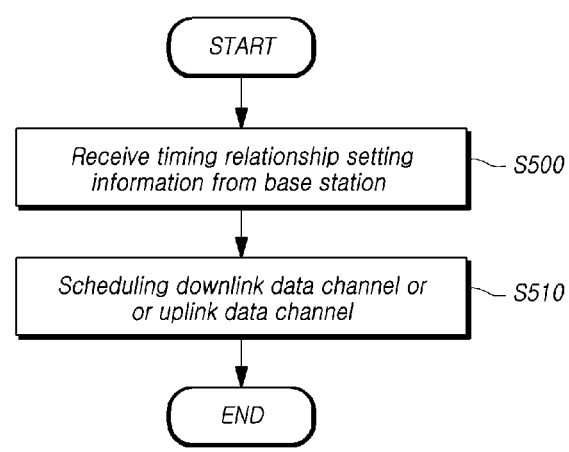
FIG. 5 is a flowchart illustrating a procedure of a user equipment for performing scheduling for a downlink data channel (PDSCH) or an uplink data channel (PUSCH) according to at least one embodiment.

FIG. 5 is a flowchart illustrating a procedure of a user equipment for performing scheduling for a downlink data channel (PDSCH) or an uplink data channel (PUSCH) in the present embodiment.

Referring to FIG. 5, the user equipment may receive, from the base station, timing relationship setting information on a timing relationship between a downlink control channel and a downlink data channel or a timing relationship between a downlink control channel and an uplink data channel (S500). As described above, a numerology used for the downlink control channel of the user equipment may be different from a numerology used for the downlink data channel (PDSCH) or the uplink data channel. Further, numerologies may be different between respective component carriers when the user equipment supports carrier aggregation. The difference between the numerologies means that subcarrier spacing values for determining the numerologies are different from each other. Thus, a numerology used for the downlink control channel of the user equipment may be different from a subcarrier spacing value used for the downlink data channel (PDSCH) or the uplink data channel (PUSCH).

For example, when the user equipment receives a downlink control channel (PDCCH) and performs scheduling of a downlink data channel (PDSCH) based on DL assignment DCI included in the downlink control channel, a subcarrier spacing value used for the downlink control channel may be different from a subcarrier spacing value used for the uplink control channel.

For another example, when the user equipment receives a downlink control channel (PDCCH) and performs scheduling of an uplink data channel (PUSCH) based on UL grant included in the downlink control channel, a subcarrier spacing value used for the downlink control channel may be different from a subcarrier spacing value used for the uplink data channel.

When the user equipment uses carrier aggregation, a component carrier used for reception of the downlink control channel may be different from a component carrier used for the transmission of the downlink data channel or uplink data channel. However, when the user equipment does not use carrier aggregation and the time-domain scheduling intervals between the downlink and the uplink are set differently, a carrier used for reception of the downlink control channel may be the same as a carrier used for transmission of the uplink data channel. In addition, when the uplink data channel is transmitted to the base station, the uplink data channel may be transmitted through a supplementary UL (SUL) used for transmission of the uplink data channel.

To solve the ambiguity problem of a timing relationship that may occur in this case, the base station may configure timing relationship setting information based on a reference numerology, and the user equipment may receive the timing relationship setting information from the base station to thus use the same.

The user equipment may receive the timing relationship setting information from the base station through DCI signaling. The user equipment may detect the DCI received through the downlink control channel (PDCCH), and the user equipment may use the timing relationship setting information included in the DCI.

The user equipment may also receive the timing relationship setting information from the base station through higher layer signaling. That is, the user equipment may receive the timing relationship setting information from the base station through UE-specific RRC signaling.

Next, the user equipment may perform scheduling of a downlink data channel or an uplink data channel based on the timing relationship setting information received from the base station (S510). The timing relationship setting information may be configured in a unit of a slot based on a numerology used for reception of a downlink data channel or a slot based on a numerology used for transmission of an uplink data channel. That is, when interpreting a timing relationship between a downlink control channel and a downlink data channel or an uplink data channel, which is scheduled according thereto, the user equipment may interpret the timing relationship based on a numerology used for reception of the downlink data channel or transmission of the uplink data channel. In this case, even if the transmission of the downlink control channel is performed in a mini-slot unit, the reception of the downlink data channel or the transmission of the uplink data channel may be performed only in a slot unit.

Figure 6:
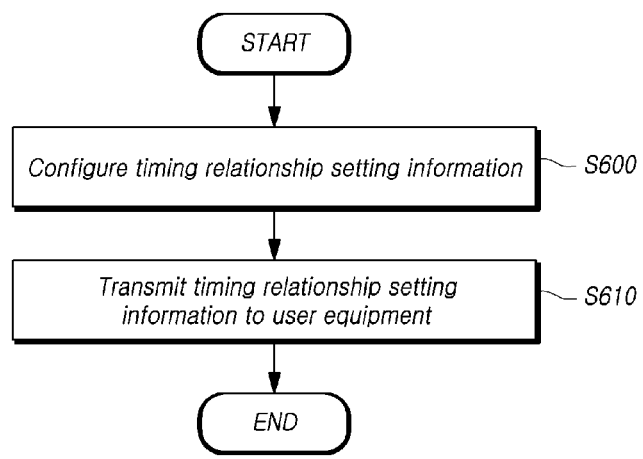
FIG. 6 is a flowchart illustrating a procedure of a base station for performing scheduling for a downlink data channel (PDSCH) or an uplink data channel (PUSCH) according to at least one embodiment.

FIG. 6 is a flowchart illustrating a procedure of a base station for performing scheduling for a downlink data channel (PDSCH) or an uplink data channel (PUSCH) in the present embodiment.

Referring to FIG. 6, the base station may configure timing relationship setting information on a timing relationship between a downlink control channel and a downlink data channel or a timing relationship between a downlink control channel and an uplink data channel (S600). As described above, a numerology used for the downlink control channel of the user equipment may be different from a numerology used for the downlink data channel or the uplink data channel, and when the user equipment supports carrier aggregation, the numerologies may be different between respective component carriers. The difference between the numerologies means that subcarrier spacing values for determining the numerologies are different from each other. Thus, a numerology used for the downlink control channel of the user equipment may be different from a subcarrier spacing value used for the downlink data channel or the uplink data channel.

For example, when the base station transmits a downlink control channel (PDCCH) and the user equipment performs scheduling of a downlink data channel (PDSCH) based on DL assignment DCI included in the downlink control channel, a subcarrier spacing value used for the downlink control channel may be different from a subcarrier spacing value used for the uplink control channel.

For another example, when the base station transmits a downlink control channel (PDCCH) and the user equipment performs scheduling of an uplink data channel (PUSCH) based on UL grant included in the downlink control channel, a subcarrier spacing value used for the downlink control channel may be different from a subcarrier spacing value used for the uplink data channel.

When the user equipment uses carrier aggregation, a component carrier used for reception of the downlink control channel may be different from a component carrier used for transmission of the downlink data channel or uplink data channel. However, when the user equipment does not use carrier aggregation and time-domain scheduling intervals between the downlink and the uplink are set differently, a carrier used for reception of the downlink control channel may be the same as a carrier used for transmission of the uplink data channel. In addition, when the uplink data channel is transmitted to the base station, the uplink data channel may be transmitted through a supplementary UL (SUL) used for transmission of the uplink data channel.

To solve the ambiguity problem of a timing relationship that may occur in this case, the base station may configure timing relationship setting information based on a reference numerology, and the user equipment may receive the timing relationship setting information from the base station to thus use the same.

The base station may transmit the timing relationship setting information to the user equipment through DCI signaling. The user equipment may detect the DCI received through the downlink control channel (PDCCH), and the user equipment may use timing relationship setting information included in the DCI.

The base station may also transmit the timing relationship setting information to the user equipment through higher layer signaling. That is, the base station may transmit the timing relationship setting information to the user equipment through UE-specific RRC signaling. Next, the base station may transmit the above-described timing relationship setting information to the user equipment (S610). The timing relationship setting information may be configured in a unit of a slot based on a numerology used for reception of the downlink data channel or a slot based on a numerology used for reception of the uplink data channel. That is, when configuring, according to the timing relationship setting information, timing relationship setting information between the downlink control channel and the downlink data channel or uplink data channel scheduled according thereto, the base station may configure the timing relationship setting information based on the numerology used for transmission of the downlink data channel or reception of the uplink data channel.

Hereinafter, more various embodiments of the above method of scheduling a downlink data channel (PDSCH) or an uplink data channel (PUSCH) by the user equipment and base station will be described in more detail.

However, although the above-described embodiment has been made of the case where the time-domain scheduling intervals are different between transmission and reception of DCI and data corresponding thereto when carriers are aggregated, the embodiments described below may be applied to any case where the time-domain scheduling intervals are different between transmission and reception of DCI and data corresponding thereto.

For example, it may be applied to i) the case where a numerology of a downlink for UL assignment DCI transmission is set to be different from a numerology of an uplink for data transmission according thereto or ii) the case where a time-domain scheduling interval of a downlink for UL assignment DCI transmission is set as slots and a time-domain scheduling interval for UL data transmission according thereto is set as mini-slots.

In addition, embodiments may be applied to any case in which the time-domain scheduling interval differs between DCI transmission and data transmission corresponding thereto.

The embodiments described below may be applied individually or in a combination thereof.

Embodiment 1. Indicate Direct Index Information

As a first method for configuring timing relationship indication information between CCs having different slot lengths as described above, timing index information may be defined to be directly indicated in a CC in which the scheduling is performed. For example, as shown in FIG. 4, in the case of a user equipment in which CA for a plurality of CCs having different SCSs and slot lengths according thereto is activated and cross-carrier scheduling is set such that scheduling for a PDSCH or PUSCH in the NR CC #2 is performed through the NR CC #1, the base station/network may be defined to include absolute timing index indication information, by which PDSCH or PUSCH transmission/reception is performed in the NR CC #2, in scheduling DCI (e.g., DL assignment DCI or UL grant) transmitted through a PDSCH of the NR CC #1 and to transmit the same to the user equipment.

More specifically, the absolute timing index indication information may include slot index indication information or subframe index indication information in the NR CC #2. Alternatively, the absolute timing index indication information may be configured in a hierarchical form. As a specific method thereof, the absolute timing index indication information may be configured in the form of (subframe index+slot index in subframe) indication information, (radio frame index+slot index in radio frame index) indication information, or (radio frame index+subframe index in radio frame+slot index in subframe) indication information.

Embodiment 2. Timing Gap Information Indication

As a method for configuring the timing relationship indication information by a base station and interpreting the same by a user equipment, the timing relationship information may be timing gap information between scheduling DCI and PDSCH or PUSCH transmission/reception resources corresponding thereto.

However, when configuring the timing gap indication information, ambiguity of setting and interpreting the timing gap may be caused by the difference of SCS values and slot lengths according thereto between a scheduling CC for transmitting a PDCCH including scheduling control information and a scheduled CC for transmitting a PDSCH or PUSCH corresponding thereto.

For example, an NR user equipment is assumed such that CA is set for an NR CC #1 having an SCS value of 15 kHz and an NR CC #2 having an SCS value of 60 kHz as shown in FIG. 4. In this case, if a scheduling unit is set based on a slot of y=14 in the CC #1 and a scheduling unit is also set based on a slot of y=14 in the CC #2 when configuring a time-domain scheduling unit for each CC in the user equipment, a TTI or slot of 1 ms is configured in the CC #1 and a TTI or slot of 0.25 ms is configured in the CC #2. If cross-carrier scheduling is set such that the scheduling control information (DCI) on the uplink/downlink data channel of the CC #2 is transmitted through the CC #1, ambiguity of setting and interpreting timing gap information between the scheduling DCI transmitted through the PDCCH of the CC #1 and the PDSCH or PUSCH corresponding thereto may occur depending on the CC for the PDSCH or PUSCH transmission. That is, since the respective CCs may be defined to have different TTIs or slot lengths such that the PDSCH or PUSCH transmission/reception through the CC #1 has a TTI or slot length of 1 ms, which is a time-domain scheduling unit of the PDSCH or PUSCH, and such that the PDSCH or PUSCH transmission/reception through the CC #2 has a TTI or slot length of 0.25 ms, which is a time-domain scheduling unit of the PDSCH or PUSCH, it is necessary to clearly set the time-domain granularity, which is a unit of timing gap indication.

Embodiment 2-1. Timing Gap Indication Based on TTI of Scheduled CC

As a method for configuring timing gap information by a base station and interpreting the same by a user equipment in the case where CA between NR CCs having different TTIs or slot lengths is configured or cross-carrier scheduling is additionally set as described above, the timing gap information may be defined to be set by the base station and to be interpreted by the user equipment based on a TTI or slot length according to an SCS value of an NR CC for PDSCH or PUSCH transmission corresponding to the DCI regardless of a TTI or slot length according to an SCS value configured in an NR CC for PDCCH transmission including scheduling control information, such as DC assignment DCI or UL grant, for the user equipment.

That is, as shown in FIG. 4, in the case where scheduling DCI (e.g., DL assignment DCI or UL grant) for an NR user equipment, in which CA is set for an NR CC #1 having an SCS value of 15 kHz and an NR CC #2 having an SCS value of 60 kHz, is intended for PDSCH or PUSCH transmission in the NR CC #1, a timing gap value between the scheduling DCI and the PDSCH or PUSCH transmission corresponding thereto may be defined to be set by the base station and to be interpreted by the user equipment in a slot unit in the NR CC #1 for the PDSCH or PUSCH transmission (i.e., a slot unit of 1 ms). In addition, in the case where scheduling DCI (e.g., DL assignment DCI or UL grant) for the user equipment is intended for PDSCH or PUSCH transmission in the NR CC #2, a timing gap value between the scheduling DCI and the PDSCH or PUSCH transmission corresponding thereto may be defined to be set by the base station and to be interpreted by the user equipment in a slot unit in the NR CC #2 for the PDSCH or PUSCH transmission (i.e., a slot unit of 0.25 ms). Reference subcarrier spacing, which is a basis for configuring the timing relationship setting information, is subcarrier spacing of a component carrier by which the PDSCH or PUSCH transmission is performed.

The above-described PUSCH may be transmitted through a supplementary UL (SUL), in which PUSCH transmission is performed. The supplementary UL (SUL) refers to a separate uplink set for transmitting data to the base station through a low-frequency band to solve a coverage problem that may occur when the user equipment performs data transmission/reception using a high-frequency band.

However, in this case, it may be necessary to define a reference point (i.e., a reference slot index) for applying the timing gap. For example, in the case where cross-carrier scheduling is set such that scheduling DCI for an uplink/downlink data channel of the CC #2 is transmitted through the PDCCH of CC #1 as shown in FIG. 4, timing gap information between the PDSCH or PUSCH transmission in the CC #2 and PDCCH transmission including the scheduling DCI thereof in the NR CC #1 may be defined to be set by the base station and to be interpreted by the user equipment in a unit of a TTI or slot length of 0.25 ms of the CC #2 in which the PDSCH or PUSCH transmission is performed. According to this, when the timing gap information is set to 'k', it is necessary to define a reference slot of the NR CC #2, which is a reference point for timing gap counting corresponding to k slots in a slot unit of 0.25 ms. As a method for this, the reference slot for timing gap counting may be determined in the NR CC, in which the PDSCH or PUSCH transmission is performed, according to SCS of the NR CC for the DCI transmission and SCS of the NR CC for PDSCH or PUSCH transmission corresponding thereto. As a method for this, the reference slot may be defined according to a ratio of the SCS for the DCI transmission to the SCS for the PDSCH or PUSCH transmission. More specifically, if an SCS value of an NR CC for DCI transmission (i.e., a scheduling CC) is 'A' kHz and an SCS value of an NR CC for corresponding PDSCH or PUSCH transmission (i.e., a scheduled CC) is 'B' kHz, when a slot index, in which PDCCH transmission including scheduling DCI is performed in the scheduling CC, is n, a reference slot index for timing gap counting may be defined as $$\left\lfloor \frac{n \cdot B}{A} \right\rfloor$$

in the corresponding scheduled CC. Accordingly, as described above, when the timing gap information is set to 'k' and the slot index for the DCI transmission in the scheduling CC is n, a slot index for corresponding PDSCH or PUSCH transmission in the scheduled CC may be defined as $$\left\lfloor \frac{n \cdot B}{A} \right\rfloor + k.$$

Here, $\lfloor m \rfloor$ denotes a floor function, and is a maximum integer equal to or less than m.

Alternatively, a slot index of a scheduled CC overlapping, in the time-domain, scheduling CC symbols in which the PDCCH transmission including scheduling DCI has been performed or the corresponding PDCCH transmission has been completed may be defined as the reference slot index. However, if there are a plurality of slots of the scheduled CC overlapping, in the time-domain, the symbols in which the PDCCH transmission including scheduling DCI has been performed or the corresponding PDCCH transmission has been completed in the scheduling CC, the largest or last slot index among the slots may be defined as a reference slot index, or the smallest or first slot index may be defined as a reference slot index.

Embodiment 2-2. Timing Gap Indication Based on TTI of Scheduling CC

As another method for configuring timing gap information by a base station and interpreting the same by a user equipment, for a user equipment in which cross-carrier scheduling is set, the timing gap information may be defined to be set by the base station and to be interpreted by the user equipment based on a TTI or slot length according to an SCS value of an NR CC (i.e., a scheduling CC) for PDCCH transmission including scheduling DCI (i.e., DC assignment DCI or UL grant) for the PDSCH or PUSCH regardless of a TTI or slot length according to an SCS value of an NR CC (i.e., a scheduled CC) for PDSCH or PUSCH transmission/reception. For example, an NR user equipment is assumed such that CA is set for an NR CC #1 having an SCS value of 15 kHz and an NR CC #2 having an SCS value of 60 kHz as described above.

In this case, timing gap information between a PDSCH or PUSCH transmitted through the CC #2 and DCI including scheduling information thereon may be defined to be set by a base station and to be interpreted by a user equipment as a timing gap value in a unit of a TTI or slot length of the CC #1 in which PDCCH transmission including the scheduling DCI is performed. That is, in the present embodiment, the timing gap information may be defined to mean a timing gap in a unit of a TTI or slot length of 1 ms, which is configured in the CC #1 for the DCI transmission, instead of a TTI or slot length of 0.25 ms, which is configured in the CC #2 for the PDSCH or PUSCH transmission/reception. According to this, in the case where the timing gap information is set to 'k', a timing relationship indication method may be defined such that the PDSCH or PUSCH transmission/reception is performed through a first slot of the NR CC #2 after k slots from the slot, in which the DCI transmission has been performed in the NR CC #1, in a slot unit of 1 ms (i.e., a first slot of the CC #2 after k*1 ms).

That is, when the timing gap information is defined to be set by a base station and to be interpreted by a user equipment in a unit of a TTI or slot length of a scheduling CC. Thus a slot index of the scheduling CC, in which PDCCH transmission including the scheduling DCI is performed, is n and the timing gap is set to k, the PDSCH or PUSCH transmission may be defined to be performed through a first slot of the scheduled CC after (k*slot length of scheduled CC)ms from a start point or end point of a slot #n of the scheduling CC.

Additionally, the above-described timing relationship indication method may be applied to any signaling method for the timing relationship indication. That is, the present disclosure may be applied to any case in which the timing relationship information is set through higher layer signaling, MAC CE signaling, or L1 control signaling.

Figure 7:
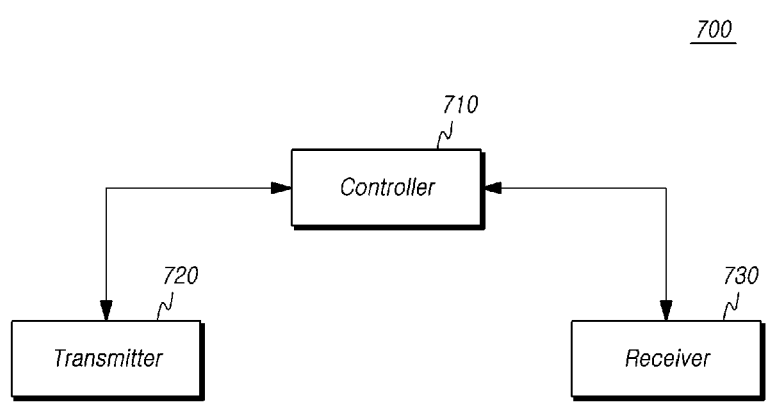
FIG. 7 is a block diagram illustrating a base station according to at least one of embodiments.

FIG. 7 is a block diagram illustrating configuration of a base station according to an embodiment.

Referring to FIG. 7, a base station 700 includes a controller 710, a transmitter 720, and a receiver 730.

The controller 710 may be configured to configure timing relationship setting information on a timing relationship between a downlink control channel and a downlink data channel or a timing relationship between a downlink control channel and an uplink data channel. The timing relationship setting information may be included in downlink control information (DCI) transmitted through the downlink control channel. In addition, the timing relationship setting information may be transmitted to the user equipment through higher layer signaling.

The downlink data channel (PDSCH) or the uplink data channel (PUSCH) is scheduled by the downlink control channel (PDCCH) described above, and a numerology used for transmission of the downlink control channel (PDCCH) is different from a numerology used for transmission of the downlink data channel (PDSCH) or reception of the uplink data channel (PUSCH). The timing relationship setting information may be configured in a unit of a slot based on a numerology used for reception of the downlink data channel or a slot based on a numerology used for reception of the uplink data channel. In this case, even if the transmission of the downlink control channel is performed in a mini-slot unit, the reception of the uplink data channel and the transmission of the downlink data channel may be performed only in a slot unit.

When the user equipment uses carrier aggregation, a component carrier used by a base station for transmission of the downlink control channel may be different from a component carrier used for transmission of the downlink data channel or reception of the uplink data channel. However, when the user equipment does not use carrier aggregation and the time-domain scheduling intervals between the downlink and the uplink are set differently, the carrier used for transmission of the downlink control channel may be the same as the carrier used for reception of the uplink data channel. In addition, when the uplink data channel is transmitted to the base station, the uplink data channel may be transmitted through a supplementary UL (SUL) used for transmission of the uplink data channel.

The transmitter 720 and the receiver 730 may be configured to transmit and receive, to and from the user equipment, signals, messages, and data necessary for implementing the present disclosure.

The transmitter 720 may be configured to transmit the above-described timing relationship setting information to the user equipment. The user equipment may perform scheduling of a downlink data channel (PDSCH) or an uplink data channel (PUSCH) based on the timing relationship setting information received from the base station.

Figure 8:
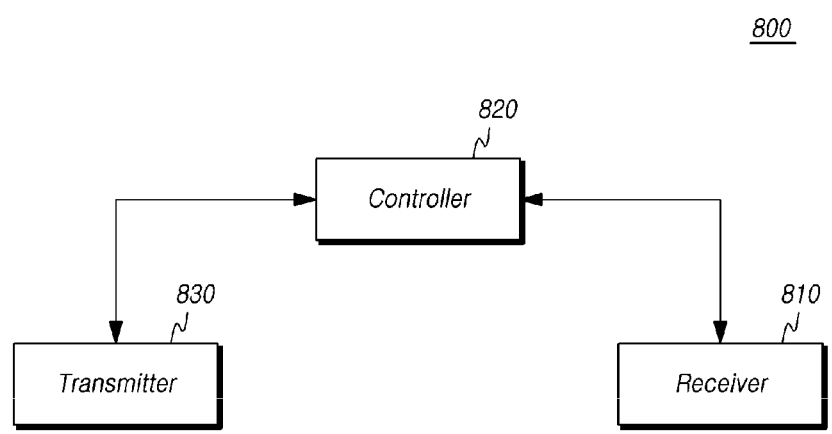
FIG. 8 is a block diagram illustrating a user equipment according to at least one of embodiments.

FIG. 8 is a block diagram illustrating a user equipment according to an embodiment.

Referring to FIG. 8, the user equipment 800 includes a receiver 810, a controller 820, and a transmitter 830.

The receiver 810 receives downlink control information, data, and messages from the base station through a corresponding channel. More specifically, the receiver 810 receives, from the base station, timing relationship setting information on a timing relationship between a downlink control channel and a downlink data channel or a timing relationship between a downlink control channel and an uplink data channel.

Timing relationship setting information may be included in downlink control information (DCI) received through the downlink control channel. The timing relationship setting information may also be received, from the base station, through higher layer signaling.

In addition, the controller 820 may be configured to perform scheduling of a downlink data channel (PDSCH) or an uplink data channel (PUSCH) based on the timing relationship setting information received from the base station.

The downlink data channel (PDSCH) or the uplink data channel (PUSCH) is scheduled by the downlink control channel (PDCCH) described above, and a numerology used for transmission of the downlink control channel (PDCCH) is different from a numerology used for transmission of the downlink data channel (PDSCH) or reception of the uplink data channel (PUSCH). The timing relationship setting information may be configured in a unit of a slot based on a numerology used for reception of the downlink data channel or a slot based on a numerology used for reception of the uplink data channel. In this case, even if the reception of the downlink control channel is performed in a mini-slot unit, the reception of the downlink data channel and the transmission of the uplink data channel may be performed only in a slot unit.

When the user equipment uses carrier aggregation, a component carrier used by the base station for transmission of the downlink control channel may be different from a component carrier used for transmission of the downlink data channel or reception of the uplink data channel. However, when the user equipment does not use carrier aggregation and time-domain scheduling intervals between the downlink and the uplink are set differently, a carrier used for transmission of the downlink control channel may be the same as a carrier used for reception of the uplink data channel. In addition, when the uplink data channel is transmitted to the base station, the uplink data channel may be transmitted through a supplementary UL (SUL) used for transmission of the uplink data channel.

The transmitter 830 transmits, to the base station, uplink control information, data, and messages through a corresponding channel.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for scheduling a downlink data channel (PDSCH) or an uplink data channel (PUSCH) by a user equipment, the method comprising:

receiving, from a base station, timing relationship setting information on at least one of i) a timing relationship between a downlink control channel and a downlink data channel and ii) a timing relationship between a downlink control channel and an uplink data channel; and scheduling at least one of the downlink data channel (PDSCH) and the uplink data channel (PUKED based on the timing relationship setting information, wherein the downlink data channel (PDSCH) or the uplink data channel (PUSCH) is scheduled by a downlink control channel (PDCCH), wherein a numerology used for reception of the downlink control channel (PDCCH) is different from a numerology used for reception of the downlink data channel (PDSCH) or transmission of the uplink data channel (PUSCH), and wherein the timing relationship setting information on at least one of i) a timing relationship between a downlink control channel and a downlink data channel and ii) a timing relationship between a downlink control channel and an uplink data channel includes timing gap information; and for a slot index n of the downlink control channel, a subcarrier spacing value A kHz of the carrier on which the downlink control channel is received, a subcarrier spacing value B kHz, of a carrier of the downlink data channel or the uplink data channel for the downlink control channel, and the value k of the timing gap information, the slot index of the downlink data channel or the uplink data channel for the downlink control channel is determined as $$\left\lfloor \frac{n \cdot B}{A} \right\rfloor + k.$$

2. The method of claim 1, wherein the timing relationship setting information is configured in one of i) a unit of a slot based on a numerology used for reception of the downlink data channel and ii) a unit of a slot based on a numerology used for reception of the uplink data channel.

3. The method of claim 1, wherein a component carrier used for reception of the downlink control channel is different from a component carrier used for reception of the downlink data channel and a component carrier used for transmission of the uplink data channel.

4. The method of claim 1, wherein a carrier used for reception of the downlink control channel is the same as a carrier used for transmission of the uplink data channel.

5. The method of claim 1, wherein the uplink data channel is transmitted through a supplementary UL (SUL).

6. The method of claim 1, wherein the timing relationship setting information is included in downlink control information (DCI) received through the downlink control channel.

7. A method for scheduling a downlink data channel (PDSCH) or an uplink data channel (PUSCH) by a base station, the method comprising:

configuring timing relationship setting information on at least one of i) a timing relationship between a downlink control channel and a downlink data channel and ii) a timing relationship between a downlink control channel and an uplink data channel; and transmitting the timing relationship setting information to a user equipment, wherein the downlink data channel (PDSCH) or the uplink data channel (PUSCH) is scheduled by a downlink control channel (PDCCH), wherein a numerology used for transmission of the downlink control channel (PDCCH) is different from a numerology used for transmission of the downlink data channel (PDSCH) or a numerology used for reception of the uplink data channel (PUSCH), and wherein the timing relationship setting information on at least one of i) a timing relationship between a downlink control channel and a downlink data channel and ii) a timing relationship between a downlink control channel and an uplink data channel includes timing gap information; and for a slot index n of the downlink control channel, a subcarrier spacing value A kHz of the carrier on which the downlink control channel is received, a subcarrier spacing value B kHz, of a carrier of the downlink data channel or the uplink data channel for the downlink control channel, and the value k of the timing gap information, the slot index of the downlink data channel or the uplink data channel for the downlink control channel is determined as $$\left\lfloor \frac{n \cdot B}{A} \right\rfloor + k.$$

8. The method of claim 7, wherein the timing relationship setting information is configured in one of i) a unit of a slot based on a numerology used for reception of the downlink data channel and ii) a unit of a slot based on a numerology used for reception of the uplink data channel.

9. The method of claim 7, wherein a component carrier used for transmission of the downlink control channel is different from a component carrier used for transmission of the downlink data channel or a component carrier used for reception of the uplink data channel.

10. The method of claim 7, wherein a carrier used for transmission of the downlink control channel is the same as a carrier used for reception of the uplink data channel.

11. The method of claim 7, wherein the uplink data channel is transmitted through a supplementary UL (SUL).

12. The method of claim 7, wherein the timing relationship setting information is included in downlink control information (DCI) transmitted through the downlink control channel.

13. A user equipment for scheduling a downlink data channel (PDSCH) or an uplink data channel (PUSCH), the user equipment comprising:

a receiver configured to receive, from a base station, timing relationship setting information on at least one of i) a timing relationship between a downlink control channel and a downlink data channel and ii) a timing relationship between a downlink control channel and an uplink data channel; and a controller configured to schedule one of the downlink data channel (PDSCH) and the uplink data channel (PUSCH) based on the timing relationship setting information, wherein the downlink data channel (PDSCH) or the uplink data channel (PUSCH) is scheduled by a downlink control channel (PDCCH), wherein a numerology used for reception of the downlink control channel (PDCCH) is different from a numerology used for reception of the downlink data channel (PDSCH) or a numerology used for transmission of the uplink data channel (PUSCH), and wherein the timing relationship setting information on at least one of i) a timing relationship between a downlink control channel and a downlink data channel and ii) a timing relationship between a downlink control channel and an uplink data channel includes timing gap information; and for a slot index n of the downlink control channel, a subcarrier spacing value A kHz of the carrier on which the downlink control channel is received, a subcarrier spacing value B kHz, of a carrier of the downlink data channel or the uplink data channel for the downlink control channel, and the value k of the timing gap information, the slot index of the downlink data channel or the uplink data channel for the downlink control channel is determined as $$\left\lfloor \frac{n \cdot B}{A} \right\rfloor + k.$$

14. The user equipment of claim 13, wherein the timing relationship setting information is configured in one of i) a unit of a slot based on a numerology used for reception of the downlink data channel and ii) a unit of a slot based on a numerology used for reception of the uplink data channel.

15. The user equipment of claim 13, wherein a component carrier used for reception of the downlink control channel is different from a component carrier used for reception of the downlink data channel or a component carrier used for transmission of the uplink data channel.

16. The user equipment of claim 13, wherein a carrier used for reception of the downlink control channel is the same as a carrier used for transmission of the uplink data channel.

17. The user equipment of claim 13, wherein the uplink data channel is transmitted through a supplementary UL (SUL).

18. The user equipment of claim 13, wherein the timing relationship setting information is included in downlink control information (DCI) received through the downlink control channel.

* * * * *

UNITED STATES PATENT AND TRADEMARK OFFICE
CERTIFICATE OF CORRECTION

PATENT NO.        : 10,506,630 B2
APPLICATION NO.   : 15/934927
DATED             : December 10, 2019
INVENTOR(S)       : Kyujin Park et al.

Page 1 of 1

It is certified that error appears in the above-identified patent and that said Letters Patent is hereby corrected as shown below:

In the Claims

In Claim 1, Column 22, Line 12, please replace "(PUKED" with --(PUSCH)--.

Signed and Sealed this
Twenty-second Day of September, 2020

Andrei Iancu
*Director of the United States Patent and Trademark Office*